(12) United States Patent
Heaton

(10) Patent No.: US 11,534,367 B2
(45) Date of Patent: Dec. 27, 2022

(54) IRRIGATION SYSTEM

(71) Applicant: Kenneth Guy Heaton, Orange, CA (US)

(72) Inventor: Kenneth Guy Heaton, Orange, CA (US)

(*) Notice: Subject to any disclaimer, the term of this patent is extended or adjusted under 35 U.S.C. 154(b) by 41 days.

(21) Appl. No.: 16/648,220

(22) PCT Filed: Sep. 22, 2018

(86) PCT No.: PCT/US2018/052326
§ 371 (c)(1),
(2) Date: Mar. 17, 2020

(87) PCT Pub. No.: WO2019/060796
PCT Pub. Date: Mar. 28, 2019

(65) Prior Publication Data
US 2020/0221653 A1    Jul. 16, 2020

Related U.S. Application Data

(63) Continuation of application No. 15/713,252, filed on Sep. 22, 2017, now abandoned.

(51) Int. Cl.
*A61H 33/00* (2006.01)
*A01G 25/16* (2006.01)
(Continued)

(52) U.S. Cl.
CPC ......... *A61H 33/005* (2013.01); *A01C 23/042* (2013.01); *A01G 25/16* (2013.01);
(Continued)

(58) Field of Classification Search
CPC .... A01C 23/042; A01G 25/16; A01G 25/165; A61H 2033/0054; A61H 2033/0058;
(Continued)

(56) References Cited

U.S. PATENT DOCUMENTS 3,560,194 A * 2/1971 Adams et al. ......... C05D 1/005
                                                  71/64.12
5,147,532 A    9/1992 Leek, Jr.
(Continued)

OTHER PUBLICATIONS

Article entitled "How Hot tubs Work" (The Spa Guys) Mar. 11, 2016 [Retrieved from the Internet] <URL: http://spaguysrepairservice.com/howtubswork.html>.
(Continued)

*Primary Examiner* — Terry K Cecil
(74) *Attorney, Agent, or Firm* — Ruggiero, McAllister & McMahon LLC

(57) ABSTRACT

An irrigation system for use with a spa includes a water heating circuit, an automatic water fill valve connected to a water source, and an irrigation pump in fluid communication with the spa through a first irrigation line and electrically connected to a power source through a switch arrangement. The irrigation pump is adapted to pump water to at least one irrigation head. The automatic water fill valve then refills the spa from the water source. The system may include a fertilizer injector, a skin-product injector, a water softener, and various sensors running through an irrigation application on a smart phone to control the irrigation system and operation of the spa.

20 Claims, 4 Drawing Sheets

(51) Int. Cl.
*A01C 23/04* (2006.01)
*G05D 9/12* (2006.01)

(52) U.S. Cl.
CPC .......... *A01G 25/165* (2013.01); *A61H 33/00* (2013.01); *A61H 33/0095* (2013.01); *A61H 33/60* (2013.01); *A61H 33/601* (2013.01); *A61H 2033/0054* (2013.01); *A61H 2033/0058* (2013.01); *A61H 2033/0079* (2013.01); *A61H 2201/0207* (2013.01); *A61H 2201/501* (2013.01); *A61H 2201/5023* (2013.01); *A61H 2201/5046* (2013.01); *A61H 2201/5058* (2013.01); *A61H 2201/5071* (2013.01); *A61H 2201/5097* (2013.01); *G05D 9/12* (2013.01)

(58) Field of Classification Search
CPC .... A61H 2033/0079; A61H 2201/0207; A61H 2201/501; A61H 2201/5023; A61H 2201/5046; A61H 2201/5058; A61H 2201/5071; A61H 2201/5097; A61H 33/00; A61H 33/005; A61H 33/0095; A61H 33/60; A61H 33/601; G05D 9/12
See application file for complete search history.

(56) References Cited

U.S. PATENT DOCUMENTS

| | | |
|---|---|---|
| 5,210,886 A | 5/1993 | Coe, III |
| 5,403,498 A | 4/1995 | Morrissey et al. |
| 6,444,129 B1 | 9/2002 | Collins |
| 6,702,942 B1 | 3/2004 | Nield |
| 6,721,630 B1 | 4/2004 | Woytowitz |
| 6,842,667 B2 | 1/2005 | Beutler |
| 10,225,996 B1 | 3/2019 | Kremicki |
| 2008/0047881 A1 | 2/2008 | Buck |
| 2010/0212764 A1 | 8/2010 | Grizzle |
| 2011/0088315 A1 | 4/2011 | Donoghue |
| 2016/0286169 A1 | 9/2016 | Sannala |
| 2016/0369483 A1 | 12/2016 | Wade |

OTHER PUBLICATIONS

Webpage entittled "Pool Water Leveler by PoolMiser" (Poomiser) Aug. 16, 2017 [retrieved from the Internet] <URL: http://poolmiser.com/poolmiser>.

* cited by examiner

IRRIGATION SYSTEM

CROSS-REFERENCE TO RELATED APPLICATIONS

This application claims the benefit of PCT Patent Application PCT/US18/52326, filed on Sep. 22, 2018, which claims the benefit of U.S. Utility patent application Ser. No. 15/713,252, filed on Sep. 22, 2017, now abandoned, both applications being incorporated herein by reference.

STATEMENT REGARDING FEDERALLY SPONSORED RESEARCH AND DEVELOPMENT

Not Applicable.

FIELD OF THE INVENTION

This invention relates to irrigation systems, and more particularly to an irrigation system for use in conjunction with a hot tub.

DISCUSSION OF RELATED ART

One drawback of a hot tub or spa is the need for strong sanitizing chemicals such as chlorine or bromine, which can adversely affect a user's skin and eyes. Such chemicals must be used, however, since the water in a typical hot tub or spa is recirculated sometimes for years. Meanwhile, residences and other locations that have such a spa often also have an irrigation system for watering landscaping plants and lawns. If the water in the spa was used for irrigation and then refilled with fresh water from a water source such as a well or municipal water utility, there would be no need to add harsh sanitizing chemicals to the water in the spa since it will quickly be used for irrigation and replaced with fresh water.

Therefore, there is a need for a system that provides for irrigation by utilizing spa water and replenishing the spa water with fresh water from a fresh water source. Such a needed system would allow for the addition of fertilizing agents into the water before the water is pumped into irrigation heads, skin conditioning substances into the spa water, and softening of the water. Such a needed invention would be controllable from an application running on a user's smart phone, and would alert the user if any of various sensors detect a fault condition. The present invention accomplishes these objectives.

SUMMARY OF THE INVENTION

The present device is an irrigation system for use with a hot tub or spa having a water heating circuit and an automatic water fill valve connected to a water source through a source line. The source line may optionally include a water softening unit disposed therealong for reducing hard minerals within the water entering the irrigation system through the source line. In some embodiments the irrigation system is added to an existing spa having the water heating circuit and the automatic water fill valve connected with the water source. In other embodiments, the irrigation system includes the spa, the water heating circuit, and the automatic water fill valve.

The irrigation system comprises an irrigation pump in fluid communication with the spa through a first irrigation line and electrically connected to a power source through a switch arrangement. The irrigation pump is adapted to pump tempered water out of the spa and into a second irrigation line that has at least one irrigation head. Many plants are beneficially watered with tempered water instead of cold, city-line water.

As such, when the switch arrangement connects the irrigation pump to the power source, water is pumped from the spa to the second irrigation line and out of the at least one irrigation head. The automatic water fill valve then refills the spa from the water source when a water level in the spa is below a predetermine threshold.

Preferably the second irrigation line further includes a pressure sensor adapted for sensing a pressure drop in the second irrigation line when the irrigation pump is activated and for activating a lower-pressure/irrigation-leak alarm. The second irrigation line may further include a fertilizer injector unit for injecting a fertilizing substance into the second irrigation line when the irrigation pump is activated. The second irrigation line may further include a fertilizer injector unit for injecting a fertilizing substance into the second irrigation line when the irrigation pump is activated.

The switch arrangement preferably further includes a controller circuit connected with the power source, and at least a timer arrangement and a manual switch. The timer arrangement is configured for receiving an irrigation schedule and activating the irrigation pump in accordance thereto. Preferably the controller circuit further includes a wireless transceiver adapted to interface with a smart phone of the user, the smart phone running an irrigation software application. The irrigation schedule may be entered on the smart phone and wirelessly transmitted to the controller circuit.

In some embodiments, wherein the water heating circuit is of the type that includes a heating pump adapted to pump water out of the spa and into a water heating unit through a first heating line, and out of the water heating unit and back into the spa through a second heating line, the irrigation system further includes a product injector unit for injecting a skin conditioning substance into the second heating line between the water heating unit and the spa when the heating pump is active. The product injector unit may further include as product level sensor configured for communicating a sensed low level of the skin conditioning substance within the product injector unit to the controller circuit. The controller circuit, in embodiments having the wireless transceiver, are configured to communicate a low-product notification to the person's smart phone and the irrigation application.

The irrigation system may further include a water level sensor disposed within the spa and adapted for communicating a sensed low water level signal to the controller circuit. The controller circuit is configured to deactivate the irrigation pump when receiving the low water level signal from the water level sensor. In embodiments having the wireless transceiver, the controller circuit is configured to communicate the low water level notification to the person's smart phone and the irrigation application.

The present invention is a system that provides for irrigation by utilizing tempered spa water and replenishing the spa water with fresh water from a fresh water source. The present system allows for the addition of fertilizing agents into the water before the water is pumped into irrigation heads, skin conditioning substances into the spa water, and softening of the water. The present invention is controllable utilizing a software application running on a user's smart phone, and alerts the user if any of various sensors detect a fault condition. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
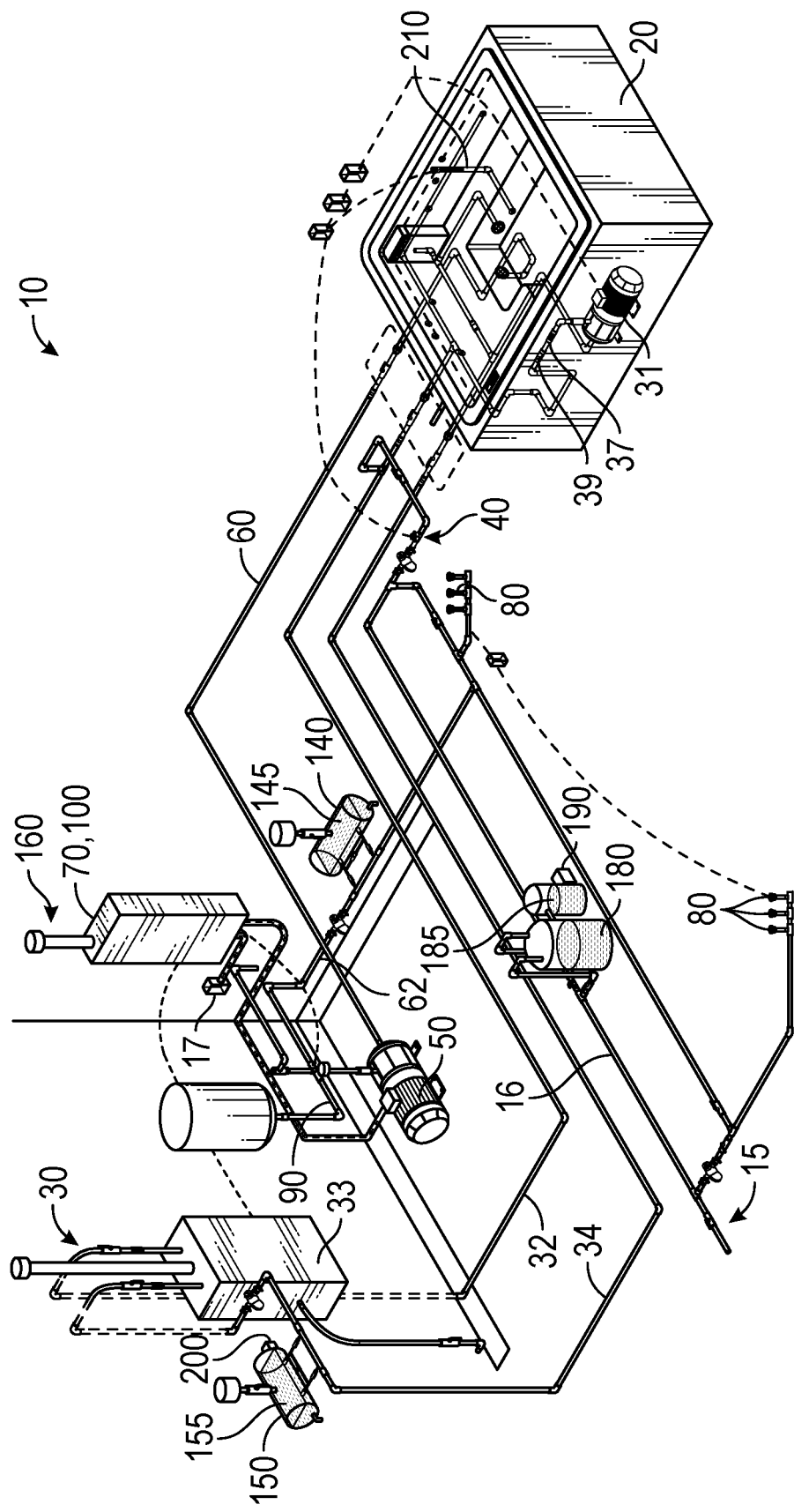
FIG. 1 is a diagram of the invention.
Figure 3:
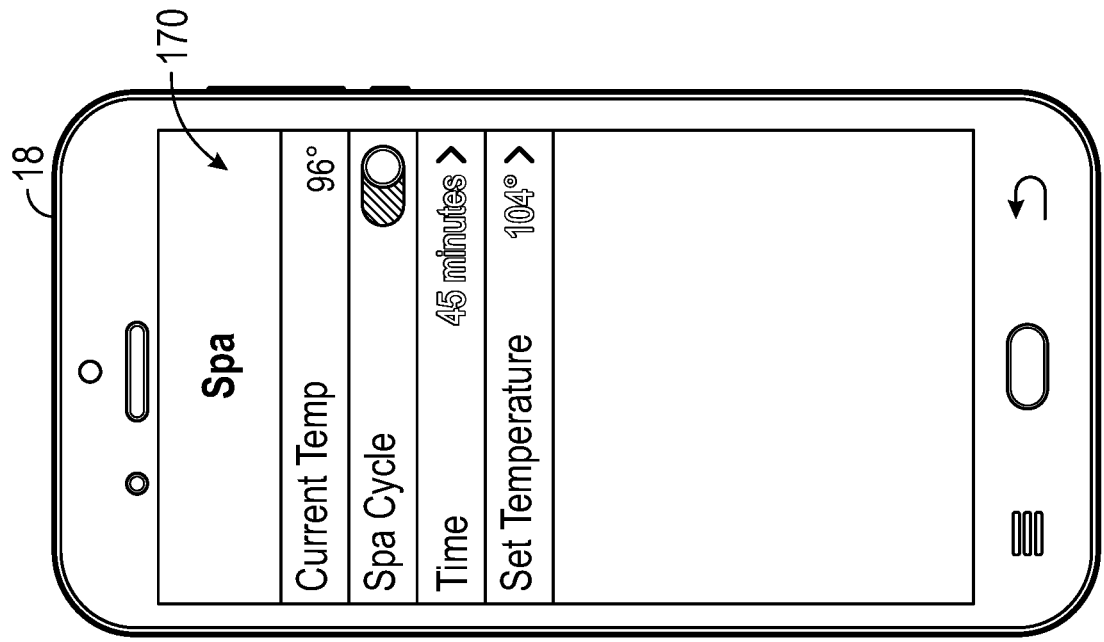
FIG. 3 is a diagram of an interface screen of a control system of the invention, illustrating an interface screen for controlling the water pump, water temperature, lighting, and the like, in a spa.
Figure 2:
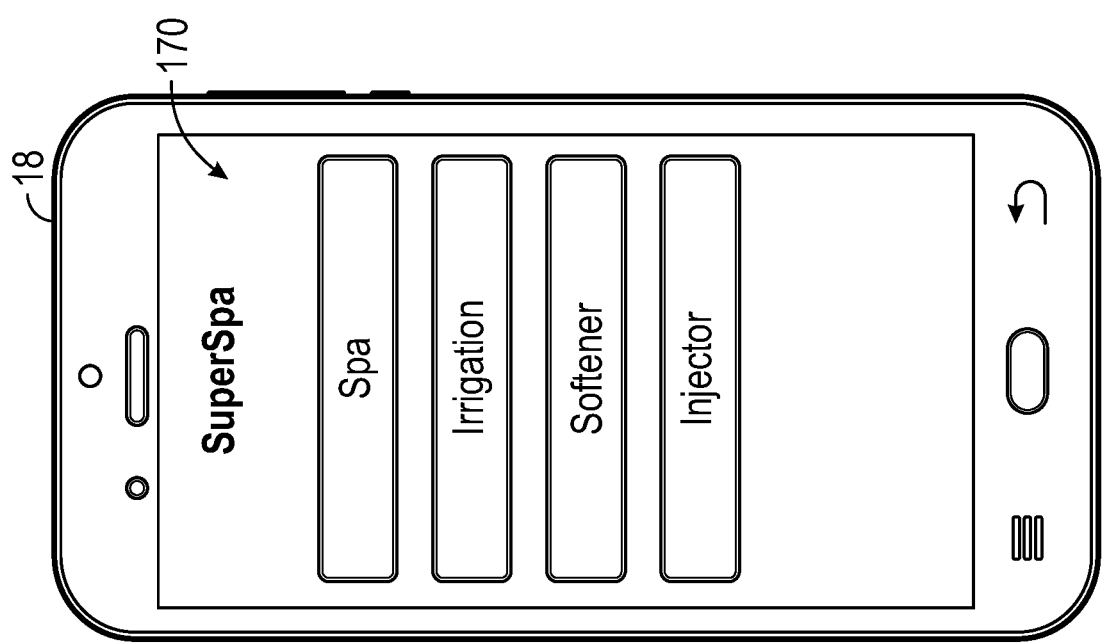
FIG. 2 is a diagram of an interface screen of a control system of the invention, illustrating an interface screen of a software application for controlling the irrigation system as being executed on a mobile smart phone.
Figure 5:
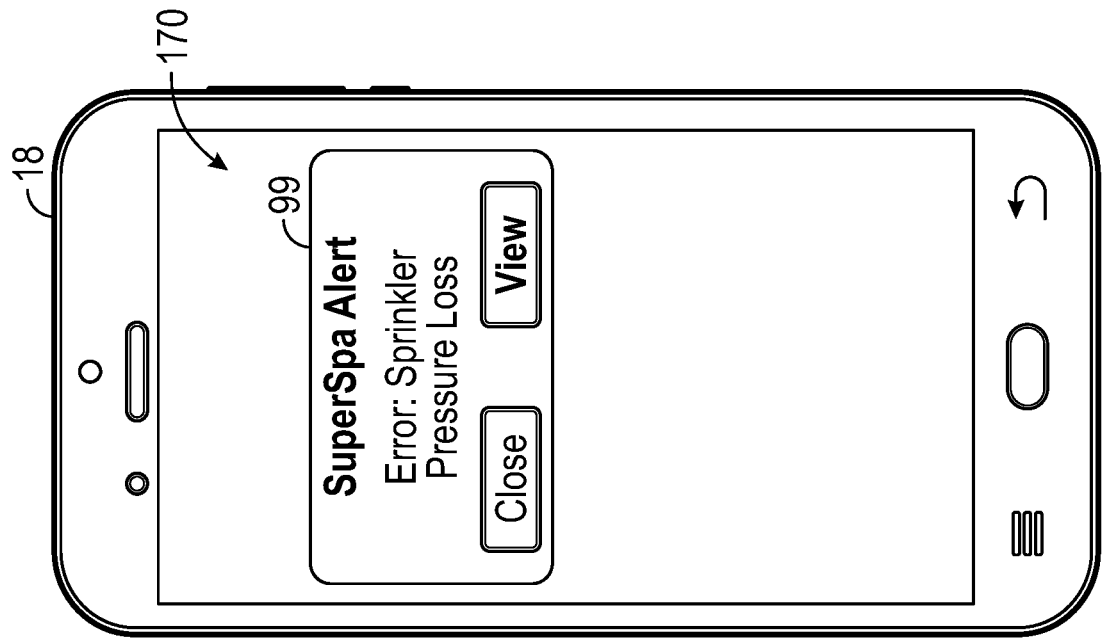
FIG. 5 is a diagram of an interface screen of a control system of the invention, illustrating a low-pressure/irrigation leak alert.
Figure 4:
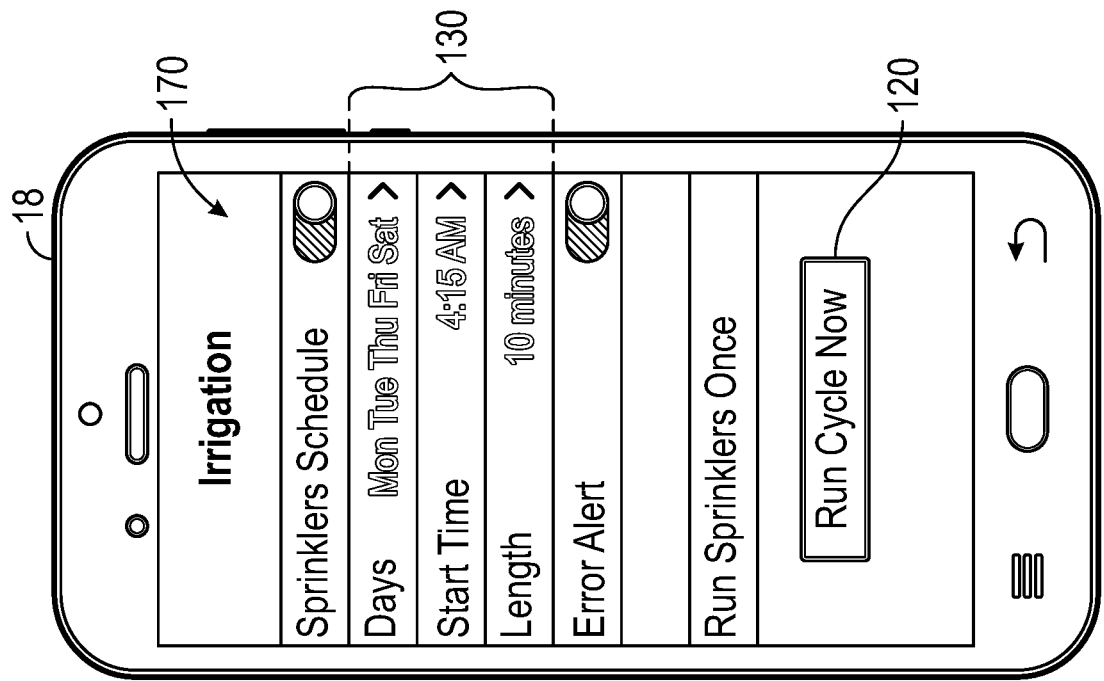
FIG. 4 is a diagram of an interface screen of a control system of the invention, illustrating an interface screen for controlling irrigation schedules that are performed by the system.
Figure 7:
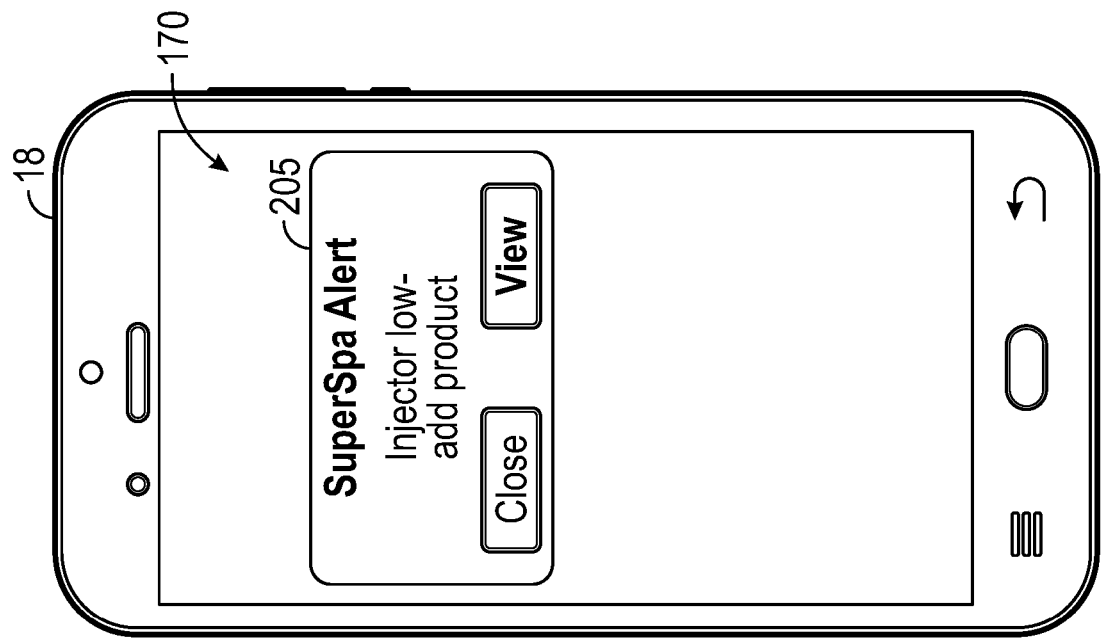
FIG. 7 is a diagram of an interface screen of a control system of the invention, illustrating a low-product notification.
Figure 6:
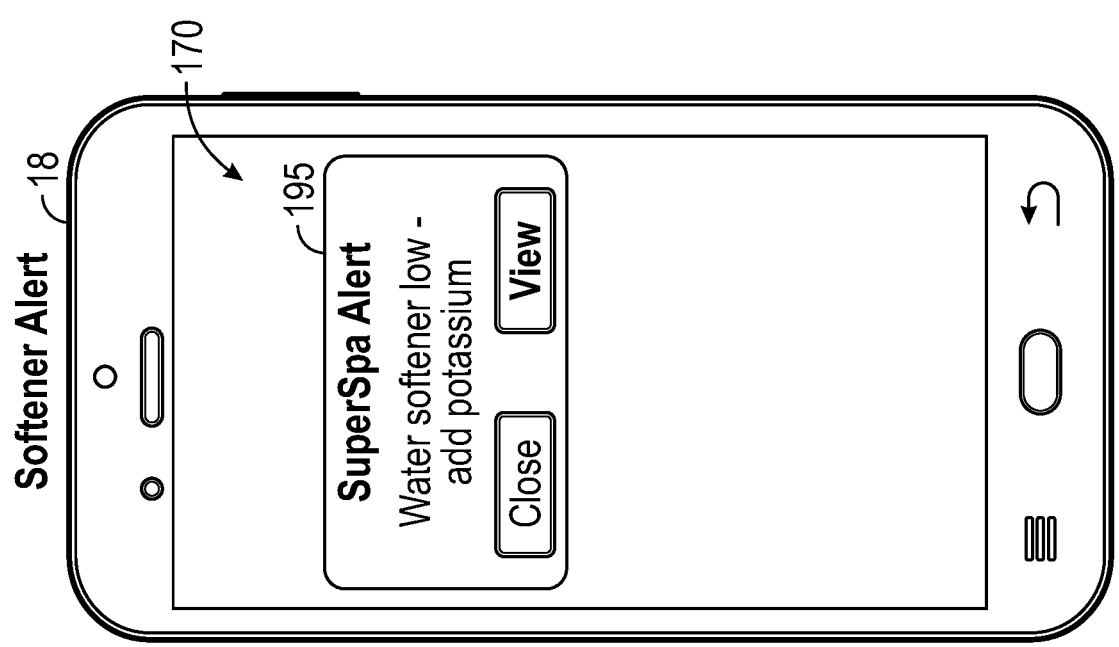
FIG. 6 is a diagram of an interface screen of a control system of the invention, illustrating a low-potassium notification.

FIG. 1 illustrates an irrigation system 10 for use with a hot tub or spa 20 having a water heating circuit 30 and an automatic water fill valve 40 connected to a water source 15 through a source line 16. The source line 16 may optionally include a water softening unit 180 disposed therealong for reducing hard minerals within the water entering the irrigation system 10 through the source line 16. In some embodiments the irrigation system 10 is added to an existing spa 20 having the water heating circuit 30, which is typically an electric heater 37 (FIG. 1), and/or the automatic water fill valve 40 connected with the water source 15. In other embodiments, the irrigation system 10 includes the spa 20, the water heating circuit 30, and the automatic water fill valve 40. The spa 20 may also include a sterilizing apparatus such as an ozone generator 39 (FIG. 1) for sterilizing the water as it circulates throughout the system 10.

The irrigation system 10 comprises an irrigation pump 50 in fluid communication with the spa 20 through a first irrigation line 60 and electrically connected to a power source 17 through a switch arrangement 70. The irrigation pump 50 is adapted to pump water out of the spa 20 and into a second irrigation line 62 that has at least one irrigation head 80.

As such, when the switch arrangement 70 connects the irrigation pump 50 to the power source 17, water is pumped from the spa 20 to the second irrigation line 62 and out of the at least one irrigation head 80. The automatic water fill valve 40 then refills the spa 20 from the water source 15 when a water level in the spa is below a predetermine threshold.

Preferably the second irrigation line 62 further includes a pressure sensor 90 adapted for sensing a pressure drop in the second irrigation line 62 when the irrigation pump 50 is activated and for activating a lower-pressure/irrigation-leak alarm 99. The second irrigation line 62 may further include a fertilizer injector unit 140 for injecting a fertilizing substance into the second irrigation line 62 when the irrigation pump 50 is activated. The second irrigation line 62 may further include (or only include) a hose bib (not shown) with a manually-actuated valve between the fertilizer injector unit 140 and the irrigation pump 50 for providing a pressurized water source to a hose (not shown), a washing machine (not shown), or the like or the like.

The switch arrangement 70 preferably further includes a controller circuit 100 connected with the power source 17, and at least a timer arrangement 110 and a manual switch 120. The timer arrangement 110 is configured for receiving an irrigation schedule 130 and activating the irrigation pump 50 in accordance thereto. The manual switch 120 is adapted or configured to activate the irrigation pump 50 upon manual actuation thereof.

Preferably the controller circuit 100 further includes a wireless transceiver 160 adapted to interface with a smart phone 18 of the user, the smart phone 18 running an irrigation software application 170. The irrigation schedule 130 may be entered on the smart phone 18 and wirelessly transmitted to the controller circuit 100.

Further, embodiments including the controller circuit 100 may also include the pressure sensor 90, such that the controller circuit receives initiates the low-pressure/irrigation-leak alarm 99 and may further send such an alarm 99 to the smart phone 18 to alert the user of a low-pressure/irrigation-leak condition. Further, embodiments with the wireless transceiver 160 may include the controller circuit 100 controlling the water heating unit 33 and heating pump 31, such control being extended to the irrigation application 170 for controlling the heating of the water in the spa 20 via one's smart phone 18.

Embodiments that include the controller circuit 100 and installed in environments wherein the water source line 16 includes the water softening unit 180 may also include a potassium level sensor 190 adapted for communicating a sensed low level of potassium substance 185 within the water softening unit 180 to the controller circuit 100. In such an embodiment the controller circuit 100 is adapted for communication a low-potassium notification 195 to the person's smart phone 18 and the irrigation application 170. Potassium is preferably used as a water softening agent instead of salt so that the irrigation system can be used with plants, which are averse to salt.

Preferably the second irrigation line 62 further includes a pressure sensor 90 adapted for sensing a pressure drop in the second irrigation line 62 when the irrigation pump 50 is activated and for activating a lower-pressure/irrigation-leak alarm 99. The second irrigation line 62 may further include a fertilizer injector unit 140 for injecting a fertilizing substance into the second irrigation line 62 when the irrigation pump 50 is activated.

In some embodiments, wherein the water heating circuit 30 is of the type that includes a heating pump 31 adapted to pump water out of the spa 20 and into a water heating unit 33 through a first heating line 32, and out of the water heating unit 33 and back into the spa 20 through a second heating line 34, the irrigation system 10 further includes a product injector unit 150 for injecting a skin conditioning substance 155 into the second heating line 34 between the water heating unit 33 and the spa 20 when the heating pump 31 is active. The product injector unit 150 may further include a s product level sensor 200 configured for communicating a sensed low level of the skin conditioning substance 155 within the product injector unit 150 to the controller circuit 100. The controller circuit 100, in embodiments having the wireless transceiver 160, are configured to communicate a low-product notification 205 to the person's smart phone 18 and the irrigation application 170. Further, the controller circuit 100 may be configured to inject the skin conditioning substance 155 only when a person is heating and using the spa 20 in a spa mode, as opposed to when the spa 20 is only being used as a reservoir for irrigation.

Such a water heating unit 33 is preferably an "instant" type gas-fueled water heater 33, which is typically more efficient than the elected heating unit 37 included with most prior art spas 20. As such, preferably the controller circuit 100 provides for bypassing the electric heating unit 37 and heating the water with the water heating unit 33 when the user desires to utilize the spa 20. The water heating unit 33 can be used, therefore, upon refilling the spa 20 or when desiring to heat-up the water in the spa 20.

Preferably the irrigation system 10 further includes a water level sensor 210 disposed within the spa 20 and adapted for communicating a sensed low water level signal to the controller circuit 100. The controller circuit 100 is configured to deactivate the irrigation pump 50 when receiving the low water level signal from the water level sensor 210. In embodiments having the wireless transceiver 160, the controller circuit 100 is configured to communicate the low water level notification 215 to the person's smart phone 18 and the irrigation application 170.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An irrigation system, comprising:
   an irrigation pump in fluid communication with a spa through a first irrigation line and electrically connected to a power source through a switch arrangement, the irrigation pump adapted to pump water out of the spa and into a second irrigation line that has at least one irrigation head, the spa having a water heating circuit and an automatic water fill valve connected to a water source through a source line, the automatic water fill valve being connected between the source line and a first heating line for refilling the spa;
   the water heating circuit including a heating pump adapted to pump water out of the spa and into a water heating unit through the first heating line, wherein the water heating circuit further includes an electric heating unit provided with the spa, and a controller circuit is configured to selectively bypass the electric heating unit provided with the spa and heat the water with the water heating unit; and
   whereby when the switch arrangement connects the irrigation pump to the power source, water is pumped from the spa to the second irrigation line and out of the at least one irrigation head, the automatic water fill valve refilling the spa from the water source when a water level in the spa is below a predetermined threshold.

2. The irrigation system of claim 1 wherein the second irrigation line further includes a pressure sensor adapted for sensing a pressure drop in the second irrigation line when the irrigation pump is activated and for activating a low-pressure/irrigation-leak alarm.

3. The irrigation system of claim 1 wherein the switch arrangement includes the controller circuit connected with the power source and having at least a timer arrangement and a manual switch, the timer arrangement adapted for receiving an irrigation schedule and activating the irrigation pump in accordance thereto, the manual switch adapted to activate the irrigation pump upon manual actuation thereof.

4. The irrigation system of claim 3 wherein the second irrigation line further includes a fertilizer injector unit for injecting a fertilizing substance into the second irrigation line when the irrigation pump is activated.

5. The irrigation system of claim 3 wherein the controller circuit includes a wireless transceiver adapted to interface with a smart phone running an irrigation application, and wherein the irrigation schedule may be entered on the smart phone and wirelessly transmitted to the controller circuit.

6. The irrigation system of claim 5 wherein the second irrigation line further includes a pressure sensor adapted for sensing a pressure drop in the second irrigation line when the irrigation pump is activated and for activating a low-pressure/irrigation-leak alarm on the smart phone.

7. The irrigation system of claim 5 wherein the controller circuit is further adapted to control the water heating circuit via instructions sent by the smart phone through the irrigation application.

8. The irrigation system of claim 5 further including a water softening unit disposed along the source line, the water softening unit adapted to reduce hard minerals within the water entering the irrigation system through the source line and further including a potassium level sensor adapted for communicating a sensed low level of a potassium substance within the water softening unit to the controller circuit, the controller circuit adapted for communicating a low-potassium notification to the irrigation application.

9. The irrigation system of claim 3 further including a water level sensor disposed within the spa and adapted for communicating a sensed low level of water within the spa to the controller circuit, the controller circuit adapted for deactivating the irrigation pump when receiving a low level of water within the spa notification from the water level sensor.

10. The irrigation system of claim 1 further including a water softening unit disposed along the source line, the water softening unit adapted to reduce hard minerals within the water entering the irrigation system through the source line.

11. The irrigation system of claim 1 the irrigation system further including a product injector unit for injecting a skin conditioning substance into the second heating line between the water heating unit and the spa when the heating pump is active;
   the product injector unit being connected to the second heating line further including a product level sensor adapted for communicating a sensed low level of the skin conditioning substance within the product injector unit to the controller circuit, the controller circuit being configured to communicate a low-product notification to an irrigation application.

12. A combination irrigation system and spa comprising:
   a spa having a water heating circuit and an automatic water fill valve connected to a water source through a source line, the water heating circuit including a heating pump adapted to pump water out of the spa and into a water heating unit through a first heating line, and then out of the water heating unit and back into the spa through a second heating line, and the automatic water fill valve being connected between the source line and the first heating line for refilling the spa;
   an irrigation pump in fluid communication with the spa through a first irrigation line and electrically connected to a power source through a switch arrangement, the irrigation pump adapted to pump water out of the spa and into a second irrigation line that has at least one irrigation head; and
   the switch arrangement including a controller circuit connected with the power source and having at least a timer arrangement and a manual switch, the timer arrangement adapted for receiving an irrigation schedule and activating the irrigation pump in accordance thereto, the manual switch adapted to activate the irrigation pump upon manual actuation thereof;
   whereby when the switch arrangement connects the irrigation pump to the power source, water is pumped from the spa to the second irrigation line and out of the at least one irrigation head, the automatic water fill valve refilling the spa from the water source when a water level in the spa is below a predetermined threshold, the switch arrangement further adapted to connect the heating pump to the power source to heat the water in the spa; and
   wherein the water heating circuit further includes an electric heating unit provided with the spa, and the controller circuit is configured to selectively bypass the electric heating unit provided with the spa and heat the water with the water heating unit.

13. The irrigation system of claim 12 wherein the second irrigation line further includes a pressure sensor adapted for sensing a pressure drop in the second irrigation line when the irrigation pump is activated and for activating a low-pressure/irrigation-leak alarm.

14. The irrigation system of claim 12 wherein the second irrigation line further includes a fertilizer injector unit for injecting a fertilizing substance into the second irrigation line when the irrigation pump is activated.

15. The irrigation system of claim 12 wherein the controller circuit includes a wireless transceiver adapted to interface with a smart phone running an irrigation application, and wherein the irrigation schedule may be entered on the smart phone and wirelessly transmitted to the controller circuit.

16. The irrigation system of claim 15 wherein the second irrigation line further includes a pressure sensor adapted for sensing a pressure drop in the second irrigation line when the irrigation pump is activated and for activating a low-pressure/irrigation-leak alarm on the smart phone.

17. The irrigation system of claim 15 wherein the controller circuit is further adapted to control the water heating circuit via instructions sent by the smart phone through the irrigation application.

18. The irrigation system of claim 15 further including a water softening unit disposed along the source line, the water softening unit adapted to reduce hard minerals within the water entering the irrigation system through the source line and further including a potassium level sensor adapted for communicating a sensed low level of a potassium substance within the water softening unit to the controller circuit, the controller circuit adapted for communicating a low-potassium notification to the irrigation application.

19. The irrigation system of claim 12 further including a water softening unit disposed along the source line, the water softening unit adapted to reduce hard minerals within the water entering the irrigation system through the source line.

20. The irrigation system of claim 12 further including a water level sensor disposed within the spa and adapted for communicating a sensed low level of water within the spa to the controller circuit, the controller circuit adapted for deactivating the irrigation pump when receiving a low level of water within the spa notification from the water level sensor.

\* \* \* \* \*